United States Patent
Hehmann et al.

(10) Patent No.: US 7,342,322 B2
(45) Date of Patent: Mar. 11, 2008

(54) ENERGY SUPPLY APPARATUS FOR A LOCATION HAVING ONE OR MORE CONSUMERS WITH SAID LOCATION BEING REMOTE FROM POWER MAINS

(75) Inventors: Mathias Hehmann, Teterow (DE); Gerald Kreft, Teterow (DE); Thomas Nehls, Teterow (DE)

(73) Assignee: Apex Energy Teterow GmbH, Teterow (DE)

( * ) Notice: Subject to any disclaimer, the term of this patent is extended or adjusted under 35 U.S.C. 154(b) by 0 days.

(21) Appl. No.: 11/540,522

(22) Filed: Oct. 2, 2006

(65) Prior Publication Data

US 2007/0132433 A1   Jun. 14, 2007

Related U.S. Application Data

(63) Continuation of application No. PCT/DE2004/002811, filed on Dec. 24, 2004.

(30) Foreign Application Priority Data

Apr. 13, 2004  (DE)  ............... 20 2004 005 733 U
Apr. 27, 2004  (DE)  ............... 20 2004 006 681 U
Nov. 12, 2004  (DE)  ............... 20 2004 017 577 U

(51) Int. Cl.
F03D 9/00 (2006.01)
(52) U.S. Cl. .................. 290/43; 290/1 R; 290/1 A
(58) Field of Classification Search ........... 290/1 R, 290/1 A, 43, 44, 54, 55; 415/2
See application file for complete search history.

(56) References Cited

U.S. PATENT DOCUMENTS

| | | | | |
|---|---|---|---|---|
| 4,379,972 A | * | 4/1983 | Sosa et al. ............ | 290/44 |
| 5,381,048 A | * | 1/1995 | Baird ................... | 290/55 |
| 5,394,016 A | * | 2/1995 | Hickey ................. | 290/55 |
| 5,512,787 A | * | 4/1996 | Dederick ............... | 290/4 R |
| 6,016,015 A | * | 1/2000 | Willard, Jr. ........... | 290/55 |
| 6,043,565 A | * | 3/2000 | Les Strange ........... | 290/55 |
| 6,097,104 A | * | 8/2000 | Russell ................ | 290/54 |
| 6,172,429 B1 | * | 1/2001 | Russell ................ | 290/54 |
| 6,427,369 B1 | | 8/2002 | Durinzi, Jr. et al. | |
| 6,559,552 B1 | * | 5/2003 | Ha ..................... | 290/54 |
| 6,661,113 B1 | * | 12/2003 | Bonin .................. | 290/55 |
| 6,897,575 B1 | * | 5/2005 | Yu ..................... | 290/44 |

(Continued)

FOREIGN PATENT DOCUMENTS

DE   35 40 822   5/1987

(Continued)

OTHER PUBLICATIONS

Walter, "Transportation Systems", Brochure, Siemens AG, TS RA PC ED2 PM, 2002, pp. 1 to 5.

*Primary Examiner*—Nicholas Ponomarenko
(74) *Attorney, Agent, or Firm*—Walter Ottesen

(57) ABSTRACT

A power supply apparatus in the form of a compact system is provided in order to eliminate the disadvantages associated with known photovoltaic power supply apparatus for locations that are remote from power mains. To this end, an additional combustion generator (11) is used selectively which, together with the prismatic switchgear cabinet (12) and at least one consumer (7), is housed inside a cylindrical housing (15).

10 Claims, 2 Drawing Sheets

U.S. PATENT DOCUMENTS 7,075,189 B2 * 7/2006 Heronemus et al. .......... 290/44
7,211,905 B1 * 5/2007 McDavid, Jr. ................ 290/44

FOREIGN PATENT DOCUMENTS

| | | |
|---|---|---|
| DE | 198 11 487 | 9/1999 |
| DE | 198 16 304 | 10/1999 |
| EP | 0 855 690 | 7/1998 |
| WO | WO 94/14150 | 6/1994 |
| WO | WO 01/63518 | 8/2001 |

* cited by examiner

ENERGY SUPPLY APPARATUS FOR A LOCATION HAVING ONE OR MORE CONSUMERS WITH SAID LOCATION BEING REMOTE FROM POWER MAINS

CROSS REFERENCE TO RELATED APPLICATIONS

This application is a continuation application of international patent application PCT/DE 2004/002811, filed Dec. 24, 2004, and claims priority of German patent application nos. 20 2004 005 733.6, filed Apr. 13, 2004, 20 2004 006 681.5, filed Apr. 27, 2004 and 20 2004 017 577.0, filed Nov. 12, 2004, and the entire contents of all said applications are incorporated herein by reference.

FIELD OF THE INVENTION

The invention relates to an energy supply apparatus for a location having one or several consumers with the location being remote from the power mains. The energy supply apparatus includes a photovoltaic unit having a solar collector, a control unit and an electrical energy store. At its input end, the control unit is connected to the solar collector, the energy store and selectively to one or several additional wind generators, water generators and/or combustion generators; whereas, at its output end, the control unit is connected to the energy store and the consumers. The control unit together with the energy store is physically accommodated in a prismatic switchgear cabinet.

Energy supply apparatus of this kind are used for small consumers in industrial and municipal areas.

BACKGROUND OF THE INVENTION

The supply of current consumers with electrical energy is no problem when these consumers are disposed close to electric power mains and when the structural complexity for connecting the consumers to the electrical power mains is possible with a reasonable effort.

However, in many cases, the connection of the small consumer to electric power mains is not possible because of the spatial distance from the power mains or also when extensive underground work is required in municipal areas.

It is generally known to operate such small consumers with a photovoltaic system when these small consumers are, for example, environmental measuring units, data units, safety units and mobile communications equipment on expressways or in open fields or these small consumers are illumination units, advertising units and marketing facilities in municipalities.

One such photovoltaic system is sold by Siemens AG and is described in the publication entitled "Transportation Systems" (TS RA PC ED2 PM) by Harald Walter, pages 1 to 5, 2002. This photovoltaic system includes a solar module which is mounted on a carrying mast secured in the ground. A switchgear cabinet is embedded in the ground at a spatial distance to this mast. The switchgear cabinet contains a control unit for supplying a consumer as needed and an energy store for taking up excessively generated energy and to output stored energy to the consumer. This switchgear cabinet is flush with the surface of the earth and has a cover for repair and maintenance purposes. Access to the control unit as well as the energy store is provided via the cover.

The control unit is functionally connected via an earth cable to the solar module and via internal cabling to the energy store. Furthermore, an earth cable leads to each spatially-remote consumer. This photovoltaic system can also be combined with one or several additional energy-generating systems via corresponding connections to the control unit. Energy-generating systems include, for example, a wind generator or a water generator.

This photovoltaic system has, however, disadvantages. First, the complexity of installation is very substantial because the solar mast as well as the switchgear cabinet and the corresponding consumers must be separately positioned and foundations prepared therefor. Making the foundation for the solar mast is very complex because it is subjected to considerable wind loads. The embedding of the switchgear cabinet in the ground is also very complex because a lot of earth must be moved. The complexity of installation is also increased by the required cabling in the ground. All this leads to an unreasonable installation cost which often bears no relationship to the use of the small consumers. Because of the high installation cost, this photovoltaic system can not be used in a portable manner. The installation complexity is further increased when the photovoltaic system is coupled to additional generators driven by wind or water because then also additional foundations and cabling are required.

Repair and maintenance work is very complicated because the control unit and the energy store are accessible only with difficulty and the control unit and energy store must be lifted to the surface from the depths of the switchgear cabinet so that they can be worked upon. This requires a very considerable bodily effort.

Also, an inadequate cooling of the energy store is a disadvantage because radiation heat emanating from the electronic components of the control unit cannot be conducted away and a temperature compensation can only take place via the ground. A controlled cooling of the energy store is not possible because the temperature of the ground is dependent upon the time of day and time of year and this cannot be influenced. This deteriorates the storage capacity of the energy store.

This photovoltaic system also does not satisfy the requirements as to safety because the above-earth solar module with its relatively thin solar mast as well as the below-ground switchgear cabinet and the driven consumer are easily accessible for everyone. For this reason, the components of the photovoltaic system can be easily damaged or manipulated.

SUMMARY OF THE INVENTION

It is an object of the invention to configure an energy supply unit as a compact system.

According to a feature of the invention, the compact system is configured in that the prismatic switchgear cabinet of the control unit as well as the combustion generator and at least one consumer are accommodated in a cylindrical housing.

According to another feature of the invention, the new energy supply unit eliminates the above-mentioned disadvantages of the state of the art. A special advantage of the invention is that the new energy supply unit with the solar module and selectively with the additional combustion generator as well as the switchgear cabinet and the consumer is configured as a compact unit and defines a usable end product. The use of a new consumer leads to a new usable end product. This opens many advantages with respect to the simplification of the installation so that the new energy supply unit can be moved from one location to another.

This results also from the cylindrically round outer wall of the housing part because the housing thereby has a large standing surface and obtains a good standing stability. The cylindrically round outer wall of the housing presents little attack surface for the wind so that a high standing reliability adjusts thereby. This saves complex foundations. In this way, the new energy unit can be placed, for example, on a normal street pavement and be attached without it requiring a special foundation. Advantages result also from the quadratic or rectangular cross-sectional form of the switchgear cabinet for the control unit and the housing, which is of circular shape in cross section, because free spaces automatically result thereby which are configured as air shafts and which can be used for the important cooling or climatization of the interior space of the housing. Only the housing has to be brought into the cylindrical shape because the switchgear cabinets are already usually available in the prismatic form. Because of their large volume, these free spaces also serve simultaneously as thermal insulation against the effect of sun force. This protects the technical apparatus disposed in the interior of the housing.

It is practical when the combustion generator and the utilized consumer are each configured as a compact unit. This simplifies the assembly and the installation and saves mounting costs.

It is also practical when the solar module and all further technical apparatus are attached from the interior of the housing because then fewer components are subjected to the weather and the safety with respect to damage or theft is increased.

It is further practical to configure the housing roof as displaceable because then the housing roof can be aligned to the course of the sun. It is also possible to configure the housing roof in two parts with a fixed lower roof part and an upper displaceable roof part. With the use of a drive, the displaceable roof or displaceable roof part can be configured to follow the course of the sun.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
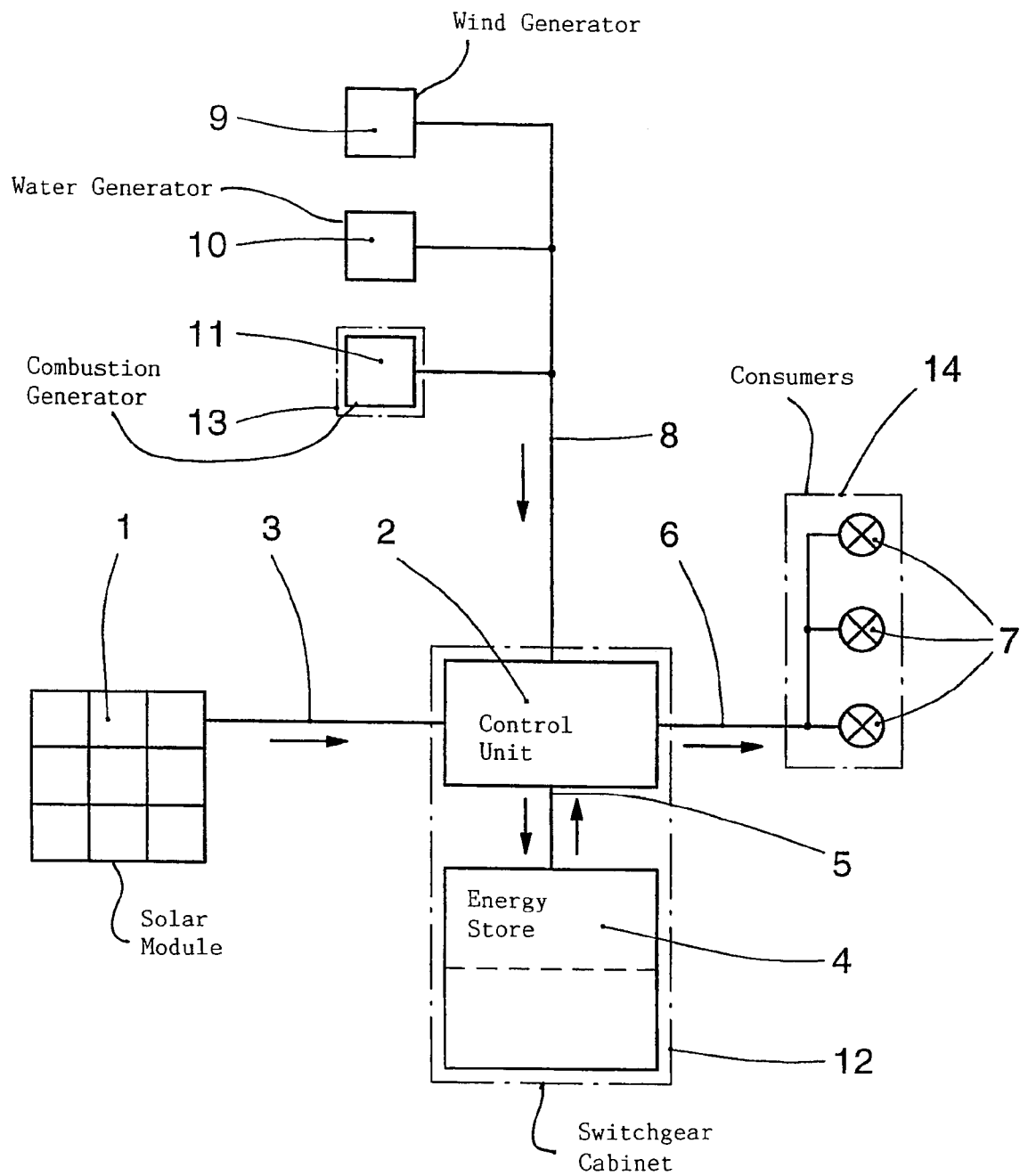
FIG. 1 is a circuit diagram showing the operation of photovoltaic system of the invention.

As shown in FIG. 1, the photovoltaic system includes a conventional, high-power solar module 1 and a control unit 2 which are both connected to each other by an electrical line 3. The photovoltaic system also includes an energy store 4 which is connected via an electric line 5 to the control unit 2. The control unit 2 is connected at its output end to one or several consumers 7 via an electric line 6. The consumers 7 can, for example, be illumination systems, measuring and signal apparatus, vending machines or apparatus for ensuring an optimal function of the energy supply system. A wind generator 9, a water generator 10 and/or a combustion generator 11, which is driven by fuel, are connected via an electric bus line 8. The wind generator 9, the water generator 10 and the combustion generator 11 are arranged parallel to each other. A gas generator is provided as a combustion generator 11.

With this configuration, electrical current, which is generated by the solar module 1, is supplied to the control unit 2 wherein the current is allocated according to need and transformed into an alternating voltage and then is supplied via the electric line 6 to the consumers 7. Current generated in excess by the solar module 1 is branched off by the control unit 2 and is supplied via the electric line 5 to the energy store 4 where it is stored. For the case wherein the current supply does not cover the requirements exclusively from the solar module 1, the control unit 2 measures the additionally required current need and switches the energy store 4 into the current supply. For an insufficient charging state of the energy store 4, the control unit 2 activates one or several of the available generators so that the full charging state of the energy store is again reached.

As FIG. 1 shows, the control unit 2 is accommodated together with the energy store 4 in a switchgear cabinet 12 which is configured in the usual manner to be prismatic with a quadratic or rectangular cross section. Furthermore, the combustion generator 11 is configured as a compact supply unit 13 and at least one consumer 7 is configured as a compact consumer unit 14.

Figure 2:
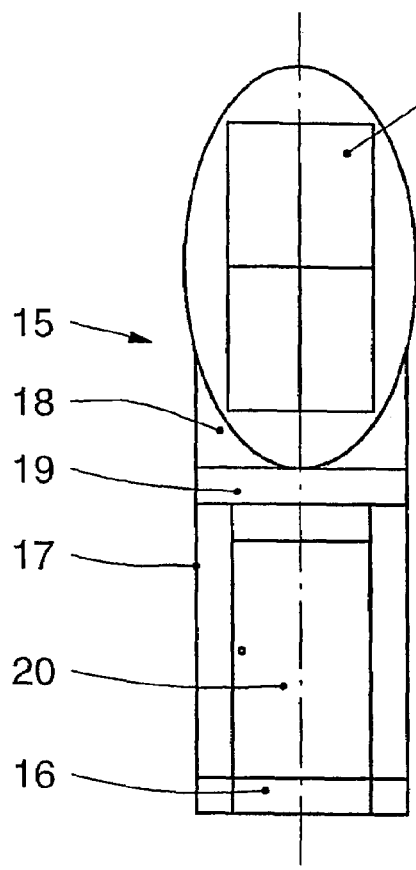
FIG. 2 is a front elevation view of the photovoltaic system of the invention.
Figure 3:
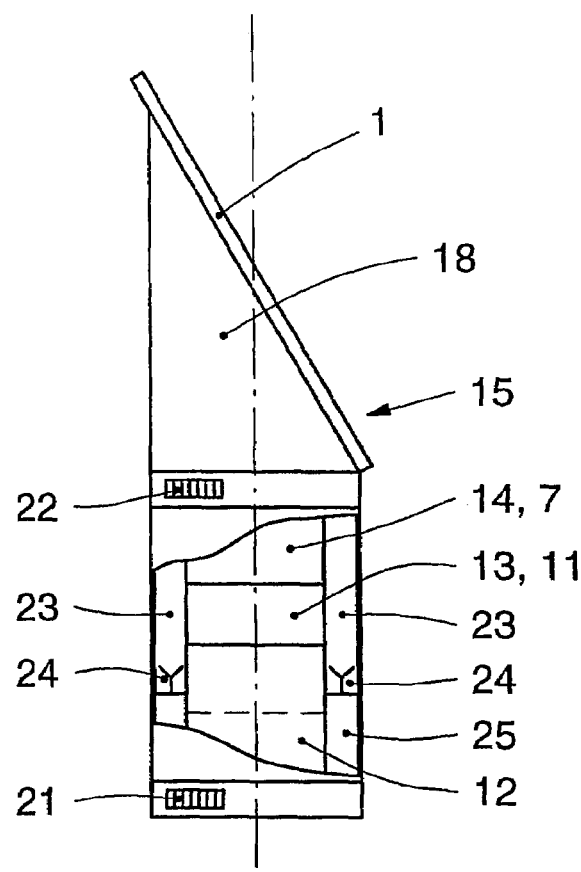
FIG. 3 is a side elevation view of the interior of the system of the invention; and, FIG. 4 is a schematicized cross-section through the photovoltaic system shown in FIGS. 2 and 3.
Figure 4:
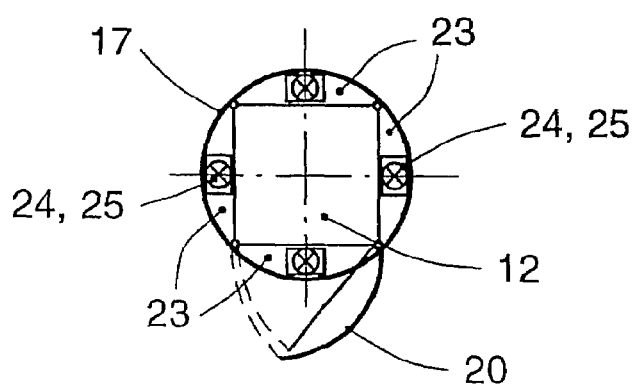

According to FIGS. 2 to 4, the prismatic switchgear cabinet 12 together with the compact supply unit 13 and the compact consumer unit 14 are accommodated in a housing 15. This housing 15 includes: a housing base 16 for connecting to a support surface; a cylindrical housing part 17 having an apparatus space which is of circular shape viewed in cross section; and, a housing roof 18. The housing base 16 is equipped with attachment elements which coact with a foundation or an anchorage embedded in the ground to guarantee a high reliability for mounting and simultaneously a rapid and easy assembly. The housing roof 18 has the shape of a beveled cylinder to define an inclined and elliptically-shaped surface. The solar module 1 is placed on this surface and is attached with elements accessible only from inside. The solar module 1 is matched in its form and size to the elliptical shape and the size of the beveled surface of the housing roof 18. The form and size of the solar module 1 can, however, also depart from the shape and size of the beveled surface of the housing roof 18.

The housing roof 18 is connected via an adjustable adaptor 19 to the cylindrical housing part 17 with which the housing roof 18 with its solar collector can be rotated and pivoted to the position of the sun.

The housing part 17 is equipped with a side entrance door 20 which is secure against break in. The entrance door 20 makes possible a free access to the circular apparatus space. This circularly-shaped apparatus space is so dimensioned that its clear inner diameter is equal to or greater than the largest cross-sectional diagonal of the prismatic switchgear cabinet 12. vertically aligned clear spaces result in this way between the curved inner wall of the circularly-shaped apparatus space and the planar outer walls of the switchgear cabinet 12. These free spaces coact with lower air openings 21 in the housing part 17 or in the housing base 16 and upper air openings 22 in the housing part 17 to form four air shafts 23 in the adaptor 19 or in the housing roof 18. The compact supply unit 13 with the gas generator and the compact consumer unit 14 likewise each have an outer contour departing from the cylindrical shape of the inner apparatus space. For this reason, the air shafts 23 naturally extend also to these regions. The air shafts 23 with their lower air openings 21 and their upper air openings 22 are so configured that a circulation of air occurs and passes by the apparatus of the control unit 2 and the energy store 4 as well as past the compact supply unit 13 and the compact consumer unit 14 for the purpose of cooling. Additionally, in each air shaft 23, one or several ventilators 24 are disposed which, as required, bring the natural air circulation into a forced circulation. The ventilators 24 are alternatively coupled to a climate control system 25 in order to obtain a selected and constant temperature in the apparatus space of the housing 15. The ventilators 24 and the climate control system 25 are electrically supplied via their own energy supply apparatus.

It is understood that the foregoing description is that of the preferred embodiments of the invention and that various changes and modifications may be made thereto without departing from the spirit and scope of the invention as defined in the appended claims.

What is claimed is:

1. An energy supply apparatus disposed at a location remote from power mains with at least one consumer, the energy supply apparatus comprising:
    a cylindrical housing;
    a photovoltaic system having a solar module;
    a generator unit;
    an electric energy store;
    a control unit having an input end connected to said solar module, said energy store and selectively with said generator unit;
    said control unit having an output end connected to said energy store and said consumer;
    a prismatic switchgear cabinet;
    said control unit and said energy store being physically accommodated in said prismatic switchgear cabinet; and,
    said generator unit, said prismatic switchgear cabinet and said consumer all being accommodated in said cylindrical housing.

2. The energy supply apparatus of claim 1, said cylindrical housing defining a cylindrical inner wall; said prismatic switchgear cabinet, said consumer and said generator unit on the one hand and said inner wall on the other hand conjointly defining a plurality of ventilating shafts communicating with the atmosphere.

3. The energy supply apparatus of claim 2, wherein said ventilating shafts are vertical ventilating shafts and said generator unit is a combustion engine having an electrical generator.

4. The energy supply apparatus of claim 2, wherein said generator unit is configured as a compact supply unit and said consumer is configured as a compact unit.

5. The energy supply apparatus of claim 3, the apparatus further comprising ventilators disposed in said ventilating shafts to provide forced air circulation.

6. The energy supply apparatus of claim 5, the apparatus further comprising a climatic system coupled to said ventilator to provide a constant temperature air circulation.

7. The energy supply apparatus of claim 2, wherein said cylindrical housing has a roof for covering said cylindrical housing;
    said roof having the shape of a beveled cylinder defining an inclined assembly surface having an elliptical shape; and,
    said solar module being placed on said elliptical surface and being attached thereto only from within said cylindrical housing.

8. The energy supply apparatus of claim 7, wherein said solar module has a form and size adapted to said assembly surface.

9. The energy supply apparatus of claim 7, further comprising an adaptor for connecting said roof to said cylindrical housing for rotating and/or pivoting at least a portion of said roof with said solar module.

10. An energy supply apparatus disposed at a location remote from power mains with at least one consumer, the energy supply apparatus comprising:
    an annular housing;
    a photovoltaic system having a solar module;
    a generator unit;
    an electric energy store;
    a control unit having an input end connected to said solar module, said energy store and selectively with said generator unit;
    said control unit having an output end connected to said energy store and said consumer;
    a prismatic switchgear cabinet;
    said control unit and said energy store being physically accommodated in said prismatic switchgear cabinet;
    said generator unit, said prismatic switchgear cabinet and said consumer all being accommodated in said annular housing;
    said annular housing defining an annular inner wall; and,
    said prismatic switchgear cabinet, said consumer and said generator unit on the one hand and said annular inner wall on the other hand conjointly defining a plurality of ventilating shafts communicating with the atmosphere.

* * * * *